No. 869,720. PATENTED OCT. 29, 1907.
W. C. MATTHIAS.
ROTARY SCREEN MECHANISM.
APPLICATION FILED JULY 29, 1907.

3 SHEETS—SHEET 3.

Witnesses
Caleb J Bieber
D. M Stewart

Wm. C. Matthias Inventor by
Attorney

UNITED STATES PATENT OFFICE.

WILLIAM C. MATTHIAS, OF READING, PENNSYLVANIA, ASSIGNOR TO OLIVER M. WEAND, OF READING, PENNSYLVANIA.

ROTARY SCREEN MECHANISM.

No. 869,720.  Specification of Letters Patent.  Patented Oct. 29, 1907.

Application filed July 29, 1907. Serial No. 385,965.

*To all whom it may concern:*

Be it known that I, WILLIAM C. MATTHIAS, a citizen of the United States, and a resident of the city of Reading, in the county of Berks and State of Pennsylvania, have invented certain new and useful Improvements in Rotary Screen Mechanism, of which the following is a specification.

My invention relates to improved rotary screen mechanism adapted more particularly for use in connection with the disposal of sewage, though applicable to other uses.

The novel features are fully described in connection with the accompanying drawings illustrating a preferred embodiment of the invention, and are specifically pointed out in the claims.

Figure 1:
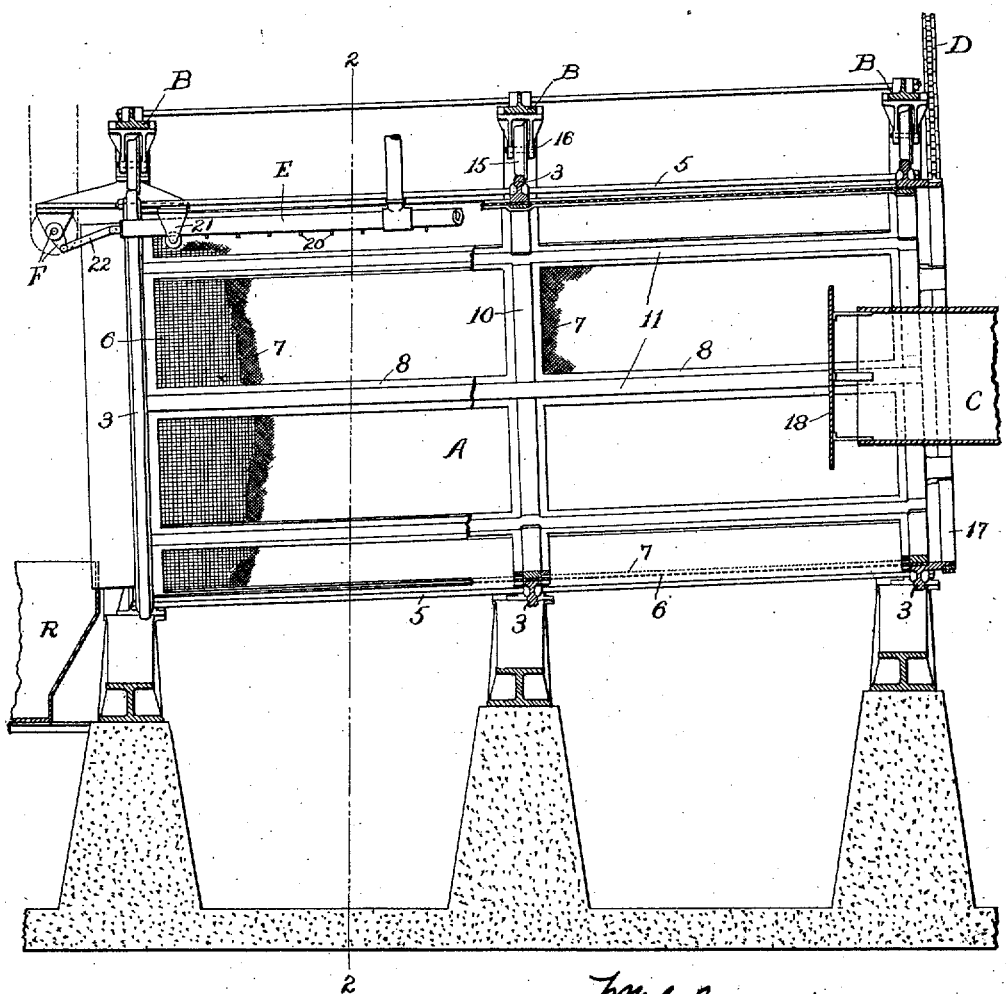
Figure 2:
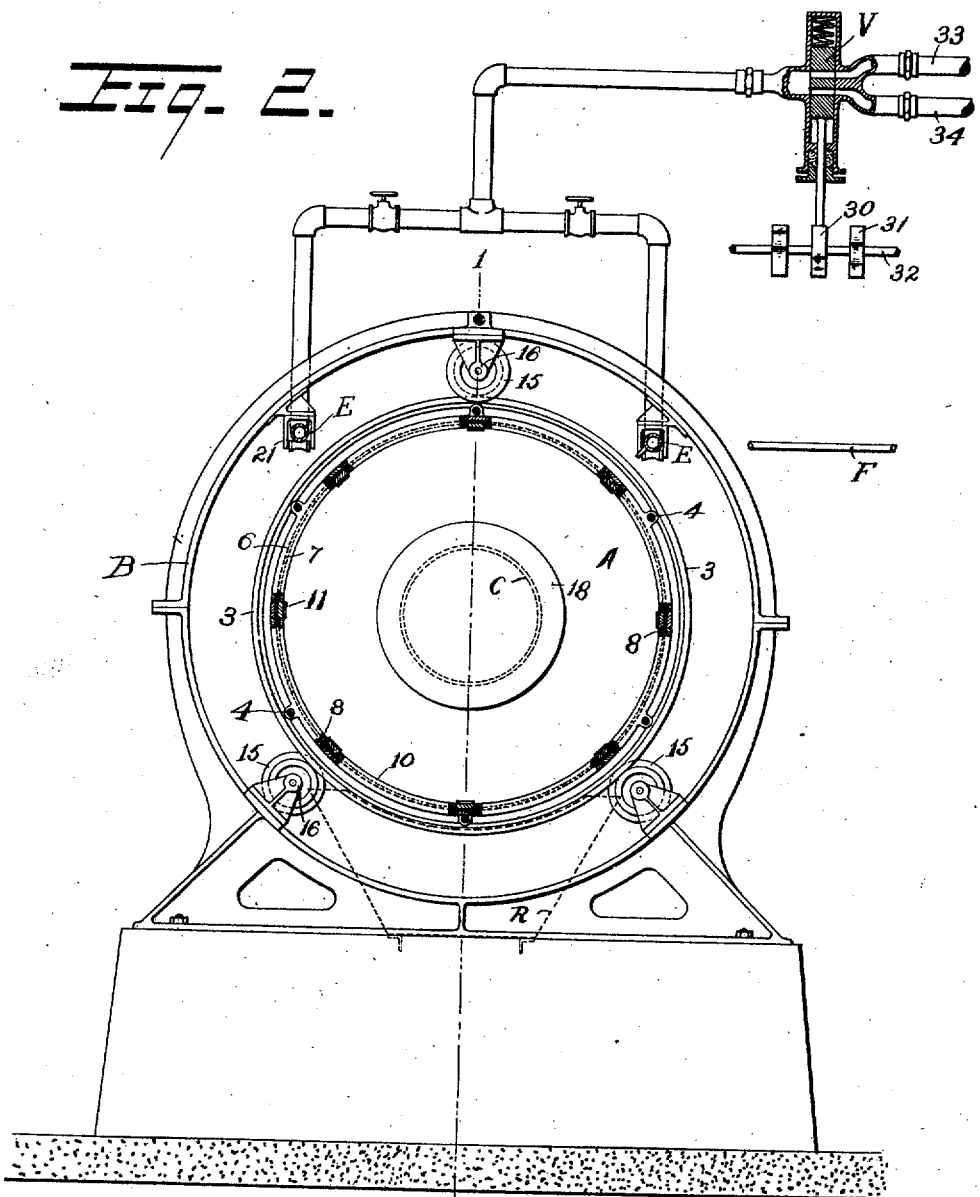
Figure 3:
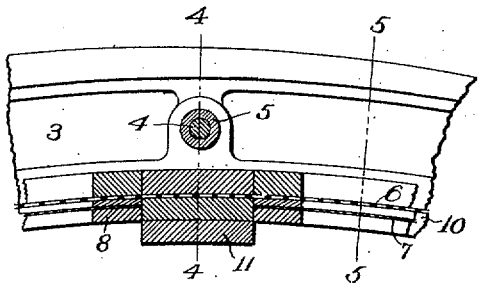
Figure 4:
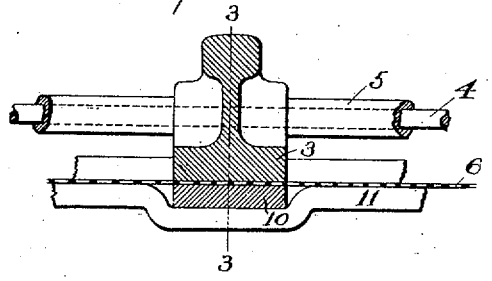
Figure 5:
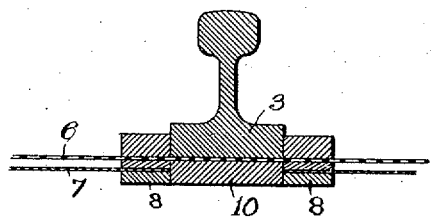
Figure 6:
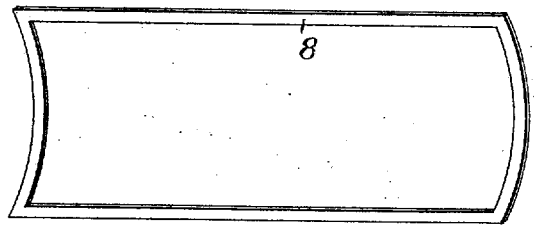

Figure 1 is a side elevation of my improved screen mechanism, shown partly in section on the line 1—1 of Fig. 2. Fig. 2 is a cross-sectional view of the same taken on the line 2—2 of Fig. 1. Figs. 3 to 6 illustrate more clearly certain detail construction.

The rotary screen as shown, is adapted to be made of large diameter, and to provide for easy renewal or extension thereof in sections as required, and for free unobstructed passage of the material operated upon from the inlet to the outlet end thereof; while the automatic maintenance of the screening in clean operative condition is positively and economically effected by the improved jet-pipe apparatus employed in connection therewith.

The screen A comprises (1) a series of exterior rings, 3, 3, 3, as shown, which are connected in properly spaced-apart relation by a circular series of exterior longitudinal bars 4, 4, 4, having spacing tubes 5, 5, 5, strung thereon between the rings; (2) a cylindrical netting 6 of relatively heavy wire and large mesh adapted to serve as a reinforcement or support for the fine interior screening; and (3) the fine interior screen lining 7 which is made up of separate panel-sections each having a rectangular framing 8 by means of which it is removably secured to the reinforcing outer netting 6. This netting 6 is preferably secured to each exterior ring 3 by means of clamping rings 10 within the latter; and these netting sections 6 are strengthened by supporting longitudinal strips 11 extending the full length of the screen and secured to the several rings. The framings 8 of the screen sections 7, fit between these parallel longitudinal strips 11 and the rings 10, and are suitably secured to the netting so as to form independently removable panels, each of which can thus be separately renewed or repaired.

To avoid all interior obstructions such as are incident to providing a central shaft or supporting trunnions with drive wheel, I employ fixed housing-rings B B B, arranged concentric with the screen rings 3, 3, 3, and each provided with preferably three rollers or guide wheels 15; said rollers being axially mounted in bearings 16 in the housing-rings and adapted to engage the exterior surface of the rotary screen rings 3 which ride thereon. These housings are so arranged as to give any desired incline to the screen A, so that material fed into the latter through the fixed supply nozzle C at one end thereof will be fed onward by the rotation of the screen to the opposite discharging end; the rotation of the screen being effected as shown by means of a drive-chain D which passes over an exterior sprocket wheel 17 on the screen. A fixed baffle-plate 18, in front of the supply nozzle C causes the delivered material to fall directly upon the rotating screen, and the liquid portion thereof is freed and discharged through the fine screening while the relatively solid matter is passed on through the lower end of the screen into any suitable receiver R.

To provide for automatically cleaning the screening so as to insure practically uniform action upon the passing material, I employ one or more jet-pipes E E extending lengthwise of the screen A, said pipes being preferably arranged adjacent the outer surface of the screen and having the jet-apertures 20 thereof spaced a considerable distance apart (in practice I prefer about a six-inch spacing) so as to provide a jet of substantial body without requiring an excessive amount of the jet-fluid. To provide for using these rather widely spaced jets so that they will act upon the entire surface of the screening, I mount the jet-pipes E in suitable bearings 21 and impart a reciprocating end-wise movement thereto equal at least to the spacing-apart of the jet-apertures 20, this movement being imparted as indicated by means of a suitably mounted crank-shaft F arranged to be rotated with the screen and having a connecting rod or rods 22 (see Fig. 1) pivoted to the movable pipe E; the jets being thus moved endwise of the rotating screen and thereby directed against all portions of its rotating surface so as to effectively clean the same. In connection with this reciprocating movement of the jet-pipe, I also provide, as indicated, first for automatically controlling the flow of the cleaning fluid so as to employ it intermittently only, and at such intervals as may be found really necessary for the purpose; and second for varying the character of the jets as may be found most effective. The desired intermittent flow is secured, as indicated, by employing a spring-pressed valve V in the fixed cleaning-liquid pipe, in connection with a rotary cam (30 or 31) for automatically moving and holding said valve in open and closed positions successively for respective periods of time determined, as will be readily understood, by the proportions of the cam selected; the cam-shaft 32 being rotated with the screen A and crank-shaft F, and the flow of the cleaning liquid being thereby caused to occur only at determined intervals and for limited times as desired.

Any suitable cleaning fluid may be employed, as water, steam, or air; and as one or other may be found advantageous under differing conditions, or perhaps a combination of them, I preferably provide for varying the jets, this being provided for, as indicated, by means of the automatically operated three-way valve V, through which one or other of the different fluids fed thereto by the different conduits 33, 34,—or a combination of these fluids as desired—may be delivered to the jet-pipe E by merely setting one or other of the cams 30, 31, so as to correspondingly operate the valve.

The length of the screen may be readily changed as desired by adding thereto additional exterior rings and panel sections of screening; any section thereof may be independently removed and conveniently renewed or repaired; and the interior of the screen is entirely open and unobstructed. The jet apertures may be made amply large to insure the most effective cleaning action upon the screening; and such action is made uniform upon the whole screening surface and at the same time limited to the requirements, by means of the reciprocating movement imparted to the jet-pipe, and the intermittent supply of the jet-fluid thereto at regular determined intervals, the character of the fluid supplied being also variable by merely properly setting the required valve-operating cam.

What I claim is:—

1. A rotary screen comprising a series of spaced-apart exterior rings, a cylindrical reinforcing netting within said rings, and a screen lining within said netting made up in separate panels each having a rectangular framing removably secured to the netting substantially as set forth.

2. A rotary screen comprising a series of spaced-apart exterior rings, a cylindrical reinforcing netting within said rings made up of a circumferential series of full-length sections and a circumferential series of longitudinal strips supporting said sections, and a screen lining within said netting made up in separate panels each having a rectangular framing removably secured to the netting between said longitudinal strips substantially as set forth.

3. A rotary screen comprising a series of spaced-apart exterior rings, a cylindrical reinforcing netting within said rings made up of a circumferential series of full-length sections, clamping rings therefor within said exterior rings, and a circumferential series of longitudinal strips supporting said sections, and a screen lining within said netting made up in separate panels each having a rectangular framing removably secured to the netting between said longitudinal strips and clamping rings substantially as set forth.

4. A rotary screen comprising a series of spaced-apart track-rings and a drive-ring all encircling the screening, in combination with circular housings for said track-rings each provided with a series of rollers upon which said rings run substantially as set forth.

5. The combination with a rotary screen of a longitudinally arranged jet-pipe having spaced-apart apertures, means for supplying a cleaning fluid to said pipe, and means for imparting reciprocating longitudinal movement to the latter during rotation of the screen substantially as set forth.

6. The combination with a rotary screen of a longitudinally arranged jet-pipe having spaced-apart apertures, means for imparting reciprocating longitudinal movement to said pipe during rotation of the screen, and means for intermittently supplying cleansing fluid at determined intervals to the reciprocating jet-pipe substantially as set forth.

7. The combination with a rotary screen of a longitudinally arranged jet-pipe having spaced-apart apertures, means for imparting reciprocating longitudinal movement to said pipe during rotation of the screen, two or more fluid conduits communicating with said movable pipe, and means for intermittently opening and closing communication between said jet-pipe and one or more of said conduits as desired, substantially as set forth.

In testimony whereof, I affix my signature, in the presence of two witnesses.

WILLIAM C. MATTHIAS.

Witnesses:
E. E. STETSON,
JAS. A. BEHM.